(12) United States Patent
Allen et al.

(10) Patent No.: US 8,937,448 B2
(45) Date of Patent: Jan. 20, 2015

(54) SYSTEMS AND METHODS FOR DOWNHOLE POWER FACTOR CORRECTION

(75) Inventors: Robert D. Allen, Claremore, OK (US);
William J. Carter, Tulsa, OK (US);
Dustin B. Campbell, Tulsa, OK (US);
John M. Knapp, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 489 days.

(21) Appl. No.: 13/300,900

(22) Filed: Nov. 21, 2011

(65) Prior Publication Data

US 2013/0127388 A1 May 23, 2013

(51) Int. Cl.
*G05F 1/70* (2006.01)
*E21B 43/12* (2006.01)
*H02P 23/00* (2006.01)

(52) U.S. Cl.
CPC .......... *E21B 43/128* (2013.01); *H02P 23/0081* (2013.01)
USPC ....................................... 318/438

(58) Field of Classification Search
CPC ... H02P 23/0081; H02P 2201/15; H02P 9/24; B60R 1/074; F24F 11/006
USPC ......................... 318/165, 508, 729
See application file for complete search history.

(56) References Cited

U.S. PATENT DOCUMENTS

| | | | |
|---|---|---|---|
| 5,994,869 A | 11/1999 | Becerra | |
| 6,014,001 A | 1/2000 | Guinet | |
| 6,489,742 B2 | 12/2002 | Lumsden | |
| 7,855,524 B2 | 12/2010 | Pummer | |
| 8,643,319 B2 * | 2/2014 | Celik | 318/400.14 |
| 2008/0180055 A1 * | 7/2008 | Zargari et al. | 318/729 |
| 2008/0202762 A1 * | 8/2008 | Grubb et al. | 166/371 |
| 2011/0057601 A1 * | 3/2011 | Hiltbold | 318/729 |
| 2011/0121775 A1 | 5/2011 | Garza | |
| 2011/0234136 A1 * | 9/2011 | Ramu | 318/438 |
| 2012/0001002 A1 * | 1/2012 | Donaldson et al. | 241/36 |

* cited by examiner

*Primary Examiner* — Shawki S Ismail
*Assistant Examiner* — Zoheb Imtiaz
(74) *Attorney, Agent, or Firm* — Law Offices of Mark L. Berrier

(57) ABSTRACT

Systems and methods for processing power provided to downhole electrical systems such as electric submersible pump motors to increase the power factor of the supplied power. In one embodiment, a system comprises a downhole motor and a power factor corrector. The motor may be coupled to drive an electric submersible pump. The power factor corrector is configured to receive input power, process the received input power using one or more capacitive electrical components and thereby impart a capacitive phase shift between the voltage and the current of the received input power. The processed output power is provided to the downhole motor, which consumes the processed output power with a power factor which is greater than it would have been in the absence of the correction.

16 Claims, 4 Drawing Sheets

SYSTEMS AND METHODS FOR DOWNHOLE POWER FACTOR CORRECTION

BACKGROUND

1. Field of the Invention

The invention relates generally to electrical motors, and more particularly to systems and methods for processing power provided to downhole electrical systems such as electric submersible pump motors to increase the power factor of the supplied power at the motor.

2. Related Art

Oil and gas are commonly produced from geological formations through wells that may be tens of thousands of feet deep. Because the naturally existing pressure in the wells may be insufficient to force the oil and gas out of the wells, artificial lift systems such as electric submersible pumps (ESP's) are often used to extract the oil and gas from the wells.

ESP systems and other downhole equipment are quite expensive. The power cables that are used to supply power to ESP systems are also costly, and may even be more expensive than the ESP systems themselves. Because this equipment is so expensive, it is important that the equipment be as reliable as possible.

One of the factors that has the greatest impact on the reliability of downhole motors is heat. Generally speaking, the more heat the motor is subjected to, the less reliable the motor will be. This problem is aggravated by the fact that the downhole environment itself is typically already very hot. It is therefore important to take heat into consideration when designing downhole equipment such as ESP motors.

One way this problem was addressed in conventional systems was by using materials in the motors that are suitable for operation in high temperatures. The motors were also designed to be as efficient as possible, so as to generate the least amount of heat possible. While these approaches are useful, it would be desirable to provide alternative means to address the effects of heat on a downhole motor by considering a factor that has been largely ignored—the power factor at the motor.

SUMMARY OF THE INVENTION

One of the things that contributes to heat generation in both downhole motors and the power cables that supply power to these motors is the reduction of the power factor as a result of the inductive characteristics of the cable and motor. The power factor is defined as the ratio of the true power consumed by the motor and the apparent power supplied to the motor. The power factor for a purely resistive circuit is 1, but for a circuit having a reactive (capacitive or inductive) component, the power factor will be less than 1. More specifically, the power factor can be computed as the cosine of the phase difference between the voltage and current. When the power factor is less than 1, the motor must draw more current to generate the same mechanical power that would be generated if the power factor was 1. For instance, if the power factor is 0.5, the motor will require twice as much current to generate the same mechanical power.

The present systems and methods therefore process or condition the power provided to the motor to increase the power factor at the motor. Since the power cable and the motor are inductive, capacitive elements are provided to balance the inductance of the cable and motor, thereby reducing the reactive component of the overall system impedance and increasing the power factor. This allows the motor to generate the same power with less current, which in turn reduces the heat generated in both the motor and the cable and increases the reliability and longevity of the system. The reduced current also makes the system more efficient. The filtering properties of the capacitive elements may reduce harmonic currents, and reduce noise at the Y-point of the motor. The reduced current may also enable the use of smaller cables in some systems, which may significantly reduce their cost.

This disclosure is directed to systems and methods for providing power to downhole equipment such as ESP motors that solve one or more of the problems discussed above. In one particular embodiment, a system comprises a downhole motor and a power factor corrector. The motor may be coupled to drive an electric submersible pump. The power factor corrector is configured to receive input power, process the received input power using one or more capacitive electrical components and thereby impart a capacitive phase shift between the voltage and the current of the received input power. The processed output power is provided to the downhole motor, which consumes the processed output power with a power factor which is greater than it would have been in the absence of the correction.

The power factor corrector may be configured as a separate unit that can be connected between a power cable and the downhole motor, or it can be integral to the motor. The power factor corrector may shift the current and voltage waveforms to reduce or minimize the phase difference between them at the output of the power factor corrector, or it may overcorrect so that the phase difference is minimized at the motor. The power factor corrector may be configured to impart a variable phase shift. The power factor corrector may therefore include multiple, selectable sets of phase shifting circuit components, each of which corresponds to a different phase shift. Sensors may be provided to monitor conditions that affect the desired phase shift. Data relating to these conditions may be provided to a control unit that selects an appropriate set of components and controls a switching mechanism to cause the power factor corrector to use the selected components.

An alternative embodiment comprises a method for increasing the power factor of the power used by a downhole motor or similar device. The method includes transmitting electrical power from a surface power source via a power cable to a downhole location. After transmission via the power cable, the electrical power may have a power factor less than 1. The electrical power is then processed at the downhole location to increase the power factor before providing the processed electrical power to the motor or other electrical device, which consumes the electrical power. The method may include sensing conditions that affect the desired power factor correction and selecting one of multiple sets of components that impart varying degrees of correction to the power factor.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
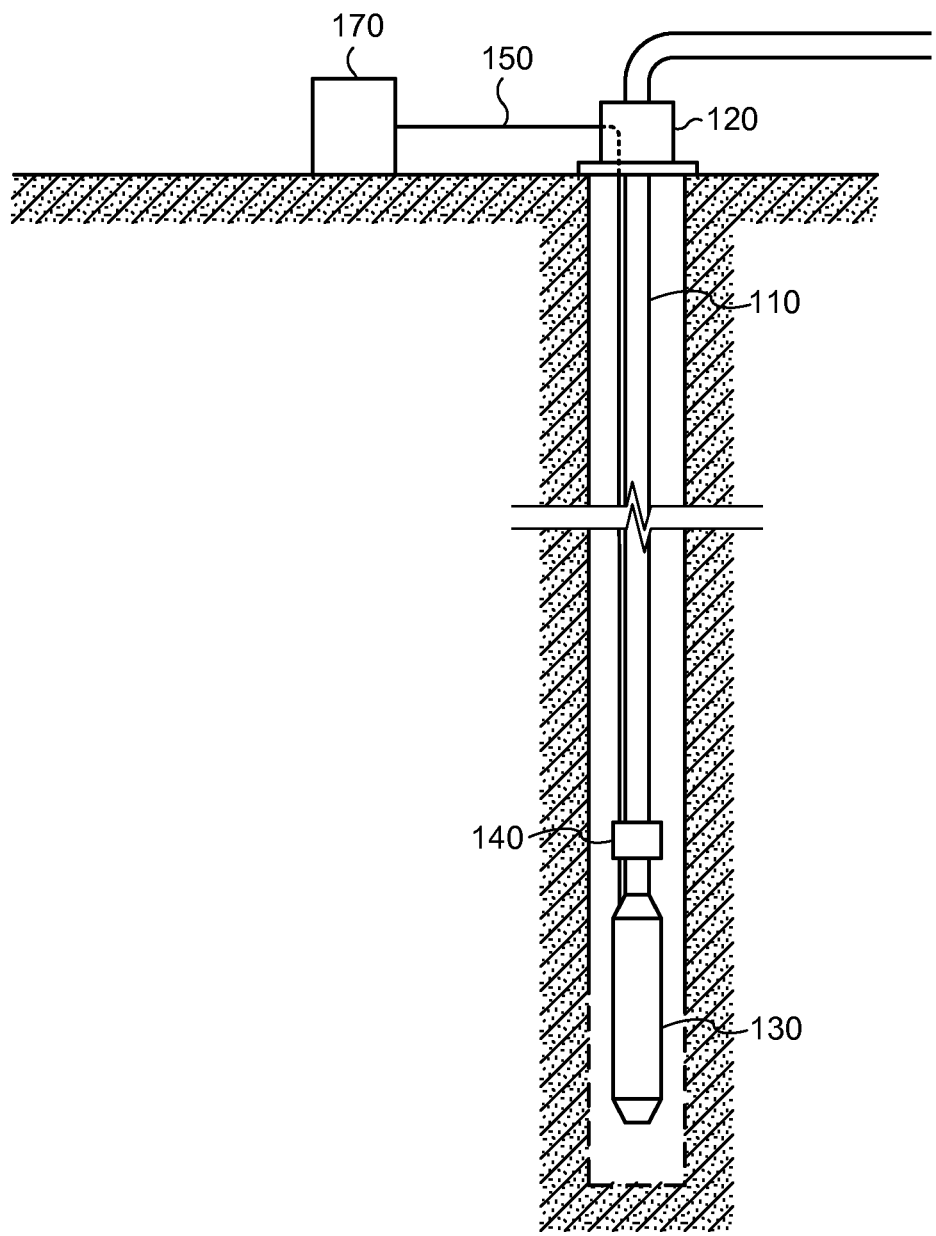
FIG. 1 is a diagram illustrating an exemplary well system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

The present invention includes systems and methods for processing power provided to downhole electrical systems such as electric submersible pump motors to increase the power factor of the supplied power at the motor. The present systems and methods may, for example, couple capacitive elements between the terminals of a motor's windings to reduce the reactive component of the overall system impedance, thereby increasing the power factor at the motor.

Referring to FIG. 1, a diagram illustrating an exemplary system in accordance with one embodiment of the present invention is shown. In this embodiment, an oil production system is installed in a well. Production tubing 110 extends from wellhead 120 into the wellbore of the well. An electric submersible pump (ESP) 130 is coupled to the end of production tubing 110. ESP 130 pumps oil through production tubing 110 to the surface of the well. ESP 130 is electrically coupled to a power source such as drive system 170 which is positioned at the surface of the well and provides power to drive the ESP.

Electrical power is transmitted from drive 170 to ESP 130 via power cable 150. The power is not provided directly from cable 150 to ESP 130. Instead, the power is received by power factor corrector 140, and is provided by the power factor corrector to ESP 130. Power factor corrector 140 is configured in this embodiment to use capacitive elements to impart a phase shift to the current of the received electrical power. This capacitive phase shift is counter to the inductive phase shift that is imparted by transmission of the power over cable 150, as well as the inductive phase shift imparted by the motor, and reduces the phase difference between the voltage and current of the power used by the motor of ESP 130.

Although power factor corrector 140 is shown in FIG. 1 as a unit that is in a housing separate from ESP 130, this need not be the case. In some embodiments, the power factor corrector may be a separate unit that can be installed with an existing ESP system, but the power factor corrector can alternatively be incorporated into the ESP system itself. The components of the power factor corrector may, for example, be installed in the head of the ESP motor between the power cable connector and the motor itself.

Figure 2:
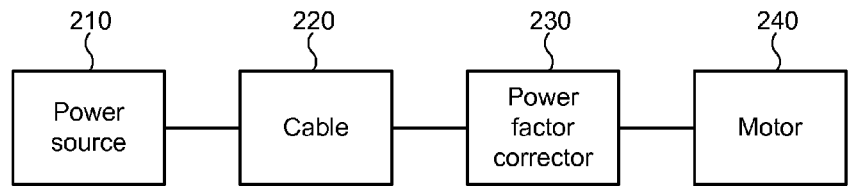
FIG. 2 is a functional block diagram of a system in accordance with one embodiment.

Referring to FIG. 2, a functional block diagram of a system in accordance with one embodiment is shown. In this embodiment, a power source 210 produces electrical AC power that will be used by a device that is located downhole in a well. The power source may be, for instance, a drive unit that receives power from a power grid and converts the received power to a form that is suitable for transmission over a cable to the downhole device. In the case of a typical ESP system, the drive unit generates three-phase AC power for use by the motor of the ESP system. In alternative embodiments, the power source may produce other types of AC power.

The power produced by power source 210 is transmitted over a cable 220 that extends from the power source at the surface of a well to a location in the wellbore which may be thousands, or even tens of thousands of feet from the power source. Transmission of the power over cable 220 normally causes a phase shift between the voltage and current of the power at the downhole end of the cable. The inductive characteristics of the motor cause even further phase shifting between the voltage and current. The resulting phase difference reduces the power factor at the motor, so that less of the power is available to generate work in the motor or other downhole device. Power cable 220 is therefore coupled to a power factor corrector 230, which processes the received power to reduce the phase difference at the motor and increase the power factor. The processed power is then provided to motor 240, which can use more of the power than would be possible in the absence of power factor corrector 230.

Figure 3:
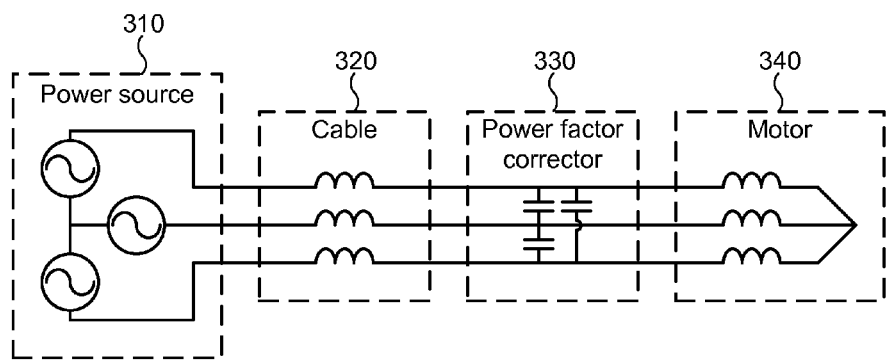
FIG. 3 is a diagram illustrating the inductive and capacitive characteristics of the various components of a system in accordance with one embodiment

Referring to FIG. 3, a diagram illustrating the inductive and capacitive characteristics of the various components of a system in accordance with one embodiment is shown. FIG. 3 again illustrates the power source (310), power cable (320), power factor corrector (330) and motor (340) of the system. Power source 310 is depicted by three sinusoidal voltage sources. These voltage sources generate three-phase power that is suitable to drive a typical three-phase ESP motor.

Figures 4A, 4B, 4C:
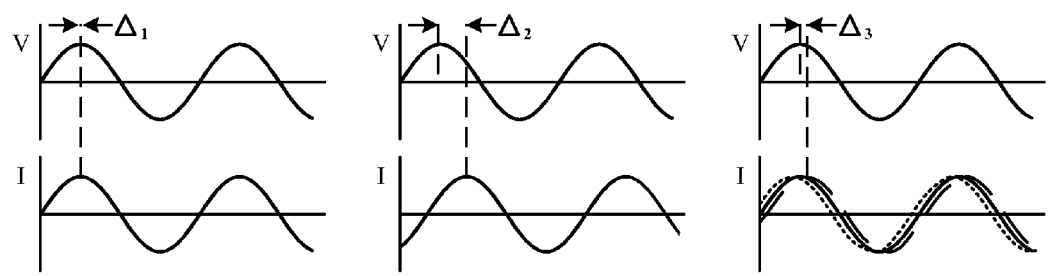
FIGS. 4A-4C are diagrams illustrating the phase relationship of the voltage and current waveforms at different points in an exemplary system.

The voltage and current of the power output by power source 310 are in sync on each conductor. In other words, the voltage and current are in phase, so that the peaks and zeros of the corresponding waveforms occur at the same time. This is illustrated by FIG. 4A. Both the voltage and current waveforms are sinusoidal. Because there is no phase difference ($\Delta_1$) between the voltage and current on each conductor, the power factor is 1, and all of the apparent power is available for use at this point. (It should be noted that the voltage and current are in sync on each conductor, but the voltage and current on one conductor are 120 degrees out of phase with the voltage and current on each of the other conductors.)

Power source 310 is coupled to the three conductors of power cable 320. As depicted in this figure, each of the conductors of cable 320 has an associated inductance. This inductance is, in large part, a function of the length of the cable. The longer the cable, the greater the inductance of each conductor. As the electrical power is transmitted over the power cable, the inductance of each conductor causes the current on the conductor to lag behind the voltage. The resulting phase difference at the downhole end of the cable is shown in FIG. 4B. Because there is a phase difference ($\Delta_2$) between the voltage and current on the conductor, the power factor at this point is less than 1. More specifically, the power factor is the cosine of the phase difference.

It can be seen from FIG. 3 that each of the windings of motor 340 also has an associated inductance. This inductance may vary based upon a number of factors, such as the load on the motor. The inductance of the motor, like the cable, causes the phase of the current to shift with respect to the voltage. As noted above, this shift results in a reduced power factor. The reduced power factor increases the amount of current that is required by the motor to generate a given amount of horsepower, which in turn results in problems such as increased heating in the motor and cable, decreased efficiency of the system, and a requirement for larger cables.

Because the inductance of the cable and motor cause the power factor to be reduced, power factor corrector 330 is inserted in this embodiment between power cable 320 and motor 340. Power factor corrector 330 utilizes capacitive elements (e.g., capacitors 331-333) to counter the inductance of the cable and motor. In other words, while inductance causes the current to lag behind the voltage, capacitance has the opposite effect, causing the current to lead the voltage. If the capacitance and inductance are balanced, their effects will cancel each other so that there is no phase difference between the current and voltage. If this is the case, the power factor will be 1, and all of the apparent power will be available to the motor. If this is the case, the motor will require less current to produce the desired amount of horsepower, thereby reducing heat, increasing efficiency and providing other, similar benefits.

In the embodiment of FIG. 3, power factor corrector 330 employs three capacitors that are coupled to the three conductors that provide power to motor 340. Each of the capacitors is connected between a corresponding pair of the three conductors. The capacitors may be selected according to the requirements of a particular application, or a system for varying the capacitance may be employed. It should be noted that, while the power factor corrector ideally provides an exact correction of the voltage/current phase difference at the motor to achieve a power factor of 1, this may be extremely difficult in practice. It is nevertheless beneficial to provide any correction that increases the power factor, as this correction will provide corresponding increases in efficiency, decreases in heating, decreases in required current, etc.

FIG. 4C shows three possible results of the correction provided by power factor corrector 330. The waveforms in this figure represent the phase relationship at the output of the power factor corrector. The solid current waveform depicts a scenario in which there is no phase difference between the voltage and current (a power factor of 1). In order to cause the power factor to be 1 at the motor, which is characteristically inductive, it may be desirable to slightly overcorrect the phase difference at the output of the power factor corrector to cause the current to lead the voltage, as shown by the dotted line in the figure. The third possible scenario is an undercorrection of the phase difference, as shown by the dashed line in the figure. In this case, the phase difference ($\Delta_3$) is reduced, as compared with the input to the power factor corrector, but the current still lags behind the voltage. Although the resulting power factor at the motor will be less than 1, it will be greater than it would have been in the absence of the power factor corrector.

While the example of FIGS. 3 and 4 implements correction of the voltage/current phase shift in a power factor corrector unit 330, the correction may be applied elsewhere. For instance, rather than having a separate power factor corrector unit, the capacitive elements may be installed in the head or base of the motor itself. In an alternative embodiment, a part of the power factor correction may be implemented prior to transmitting the power over the cable to the downhole devices. For instance, the drive unit may incorporate capacitors similar to those described in connection with FIG. 3, or a power factor corrector unit may be employed between the drive unit and the cable.

Figure 5:
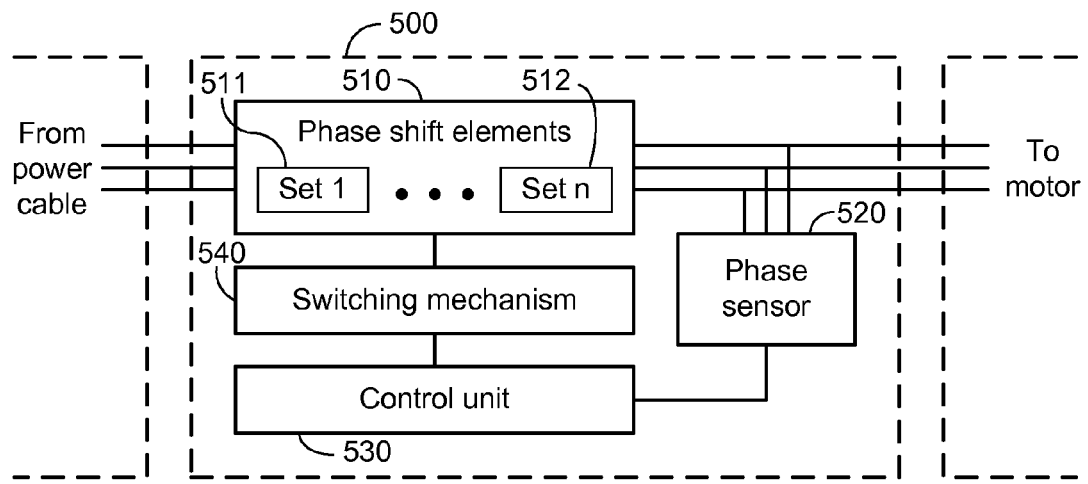
FIG. 5 is a functional block diagram illustrating the structure of an exemplary variable-correction unit in accordance with one embodiment.

Although the diagram of FIG. 3 depicts only three capacitors coupled between the three conductors, other embodiments may use more complex configurations of components (e.g., capacitive circuits, rather than simple capacitors), or may couple the components to the system in a different manner. Additionally, alternative embodiments may be configured so that the effect of the power factor corrector is variable. Referring to FIG. 5, a functional block diagram illustrating the structure of an exemplary variable-correction unit is shown. In this embodiment, power factor corrector 500 has phase shift elements 510 that include multiple different sets of elements (e.g., 511, 512), each of which provides a different capacitive component and corresponding phase shift. One of the sets is selected and used to implement the corresponding correction.

In the embodiment of FIG. 5, power factor corrector 500 is configured to automatically adjust the power factor correction. Phase sensor 520 senses the phase difference between the voltage and current provided to the motor. This information is provided to a control unit 530, which determines the desired correction and selects the set of elements (e.g., 511, 512) that will provide this correction. Control unit 530 then controls a switching mechanism 540 to physically configure the corrector to use the selected set of elements. A similar mechanism could be implemented at the power source to allow the power to be preconditioned (capacitively shifted) by varying degrees.

Figure 6:
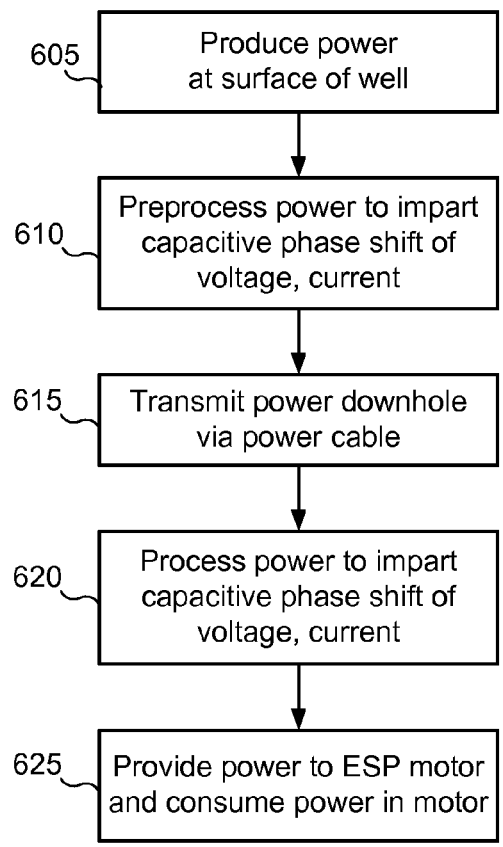
FIG. 6 is a flow diagram illustrating a method for providing power to an ESP motor in accordance with one embodiment.

In addition to the foregoing embodiments of the invention, another alternative embodiment comprises a method. The method is illustrated by the flow diagram of FIG. 6. In this embodiment, power is produced at the surface of a well by a power source such as an ESP drive unit 605. The power produced by the drive unit may optionally be preprocessed to impart a capacitive phase shift between the voltage and current 610. The power is then transmitted downhole via the power cable that couples the power source to the downhole equipment 615. The power is received at the downhole end of the cable and is processed to impart a capacitive phase shift between the voltage and current 620. This processed power is then provided to downhole electric equipment such as an ESP motor, which consumes the power 625.

Figure 7:
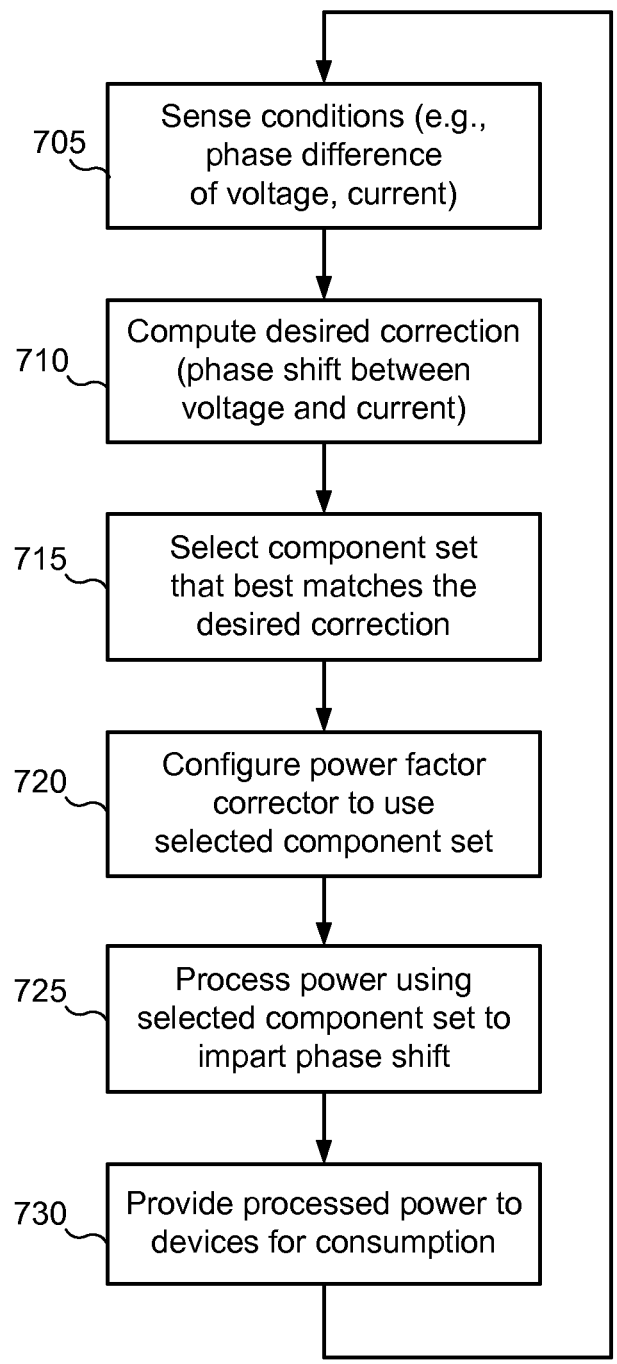
FIG. 7 is a flow diagram illustrating a method for processing power to increase the power factor using multiple sets of components in accordance with one embodiment.

Referring to FIG. 7, a flow diagram illustrating another alternative embodiment is shown. This method concerns the use of multiple different sets of electrical components to achieve the desired power factor correction. The method begins with the sensing of conditions that affect the choice of phase correction elements 705. These conditions may include, for example, the phase difference of the voltage and current waveforms of received power, motor loading, and the like. Based on the sensed conditions, a desired correction is computed 710. One of the available sets of phase correction components that best matches the desired correction is then selected 715. The power factor corrector is then configured to use the selected components 720, and the power is processed using the selected components 725. The processed power is then delivered to the motor and/or other devices to be consumed 730. In one embodiment, this process is performed iteratively, using the feedback from the sensors to correct the configuration of the power factor corrector and optimize the power factor at the motor. The process may be performed continuously to adapt the system to changing operating conditions.

The embodiments described above are exemplary, and many variations of the features described above may be implemented in alternative embodiments. For example, as noted above, various embodiments may use different numbers and types of electronic components to perform the processing and change the power factor, processing may be performed only downhole or both downhole and at the surface, processing components may be automatically or manually switched, and so on. Many other variations will also be apparent to those of skill in the art of the invention. All of these variations are believed to be within the scope of the claims below.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
   an electric drive positioned at the surface of a well, wherein the electric drive outputs a first power signal
   a downhole motor;
   a power factor corrector coupled to the downhole motor;
   a power cable coupled between the electric drive and the power factor corrector, wherein the power cable carries the first power signal from the electric drive to the power factor corrector, imparts an inductive phase shift to the first power signal, and provides the phase-shifted first power signal as input power to the power factor corrector, wherein the input power has a first power factor;
   wherein the power factor corrector is configured to process the received input power using one or more capacitive electrical components and thereby impart a capacitive phase shift between a voltage and a current of the received input power, and provide processed output power to the downhole motor, wherein the processed output power has a second power factor that is greater than the first power factor.

2. The system of claim 1, wherein the power factor corrector has one or more power input terminals and one or more power output terminals; wherein the downhole motor has one or more power input terminals; wherein each of the power output terminals of the power factor corrector is connected to a corresponding one of the power input terminals of the downhole motor; wherein the power factor corrector is configured to receive input power through the power input terminals of the power factor corrector, the input power having a power factor of less than 1; wherein the power factor corrector is configured to produce output power at the power output terminals of the power factor corrector, the output power having a power factor that is greater than the power factor of the input power.

3. The system of claim 1, wherein the downhole motor is coupled to drive an electric submersible pump.

4. The system of claim 1, wherein the power factor corrector is configured to change the power factor by imparting a phase shift between a voltage of the output power and a current of the output power.

5. The system of claim 4, wherein the magnitude of the imparted phase shift is variable.

6. The system of claim 5, wherein the power factor corrector includes a plurality of selectable sets of phase shifting circuit components, wherein each of the sets of phase shifting circuit components imparts a different phase shift between the voltage of the output power and the current of the output power, wherein only a single one of the selectable sets of phase shifting circuit components is used at a time.

7. The system of claim 6, further comprising a switching unit coupled to the plurality of selectable sets of phase shifting circuit components, wherein the switching unit is configured to cause a selected one of the sets of phase shifting circuit components to be used to impart the phase shift between the voltage of the output power and the current of the output power.

8. The system of claim 7, further comprising a control unit configured to: determine a phase difference between a voltage of the input power and a current of the input power; choose the selected one of the sets of phase shifting circuit components in dependence upon the sensed phase difference; and control the switching unit to cause the selected one of the sets of phase shifting circuit components to be used to impart the phase shift between the voltage of the output power and the current of the output power.

9. The system of claim 8, further comprising one or more sensors configured to measure the phase difference between the voltage of the input power and the current of the input power.

10. The system of claim 1, further comprising one or more capacitors coupled to the surface power source, wherein the one or more capacitors impart a capacitive phase shift between a voltage and a current of power that is output by the electric drive and transmitted via the power cable to the power factor corrector.

11. A method comprising:
    transmitting electrical power from a surface power source via a power cable to a downhole location and thereby imparting an inductive phase shift to the electrical power, wherein after transmission via the power cable, the electrical power has a power factor which is less than 1;
    processing the electrical power at the downhole location, thereby imparting a capacitive phase shift to the electrical power and increasing the power factor of the electrical power provided to the electrical device; and
    providing the processed electrical power to the electrical device at the downhole location, wherein the electrical device consumes the electrical power.

12. The method of claim 11, wherein the electrical device comprises a motor.

13. The method of claim 12, wherein the motor comprises a component of an electrical submersible pump system.

14. The method of claim 11, further comprising processing the electrical power provided by the power source prior to transmitting the electrical power via the power cable, thereby imparting a phase shift which reduces the power factor of the electrical power.

15. The method of claim 11, wherein processing the electrical power at the downhole location comprises sensing a phase difference between a voltage of the electrical power and a current of the electrical power between the power cable and the electrical device and reducing the phase difference prior to providing the processed electrical power to the electrical device.

16. The method of claim 15, wherein reducing the phase difference comprises providing a plurality of selectable sets of phase shifting circuit components, selecting one of the sets of phase shifting circuit components in dependence upon the sensed phase difference, and processing the electrical power using only the selected set of phase shifting circuit components.

* * * * *